June 28, 1927.
C. E. VAWTER
1,633,912
INDICATING OHMMETER
Filed Jan. 7, 1922
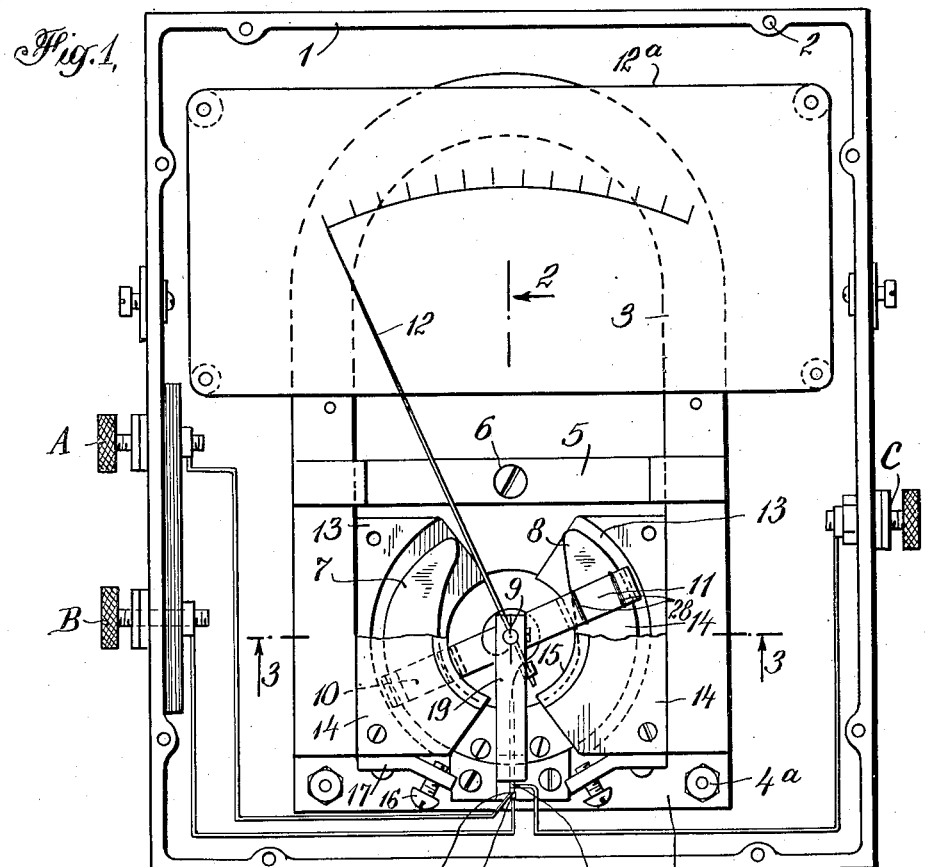
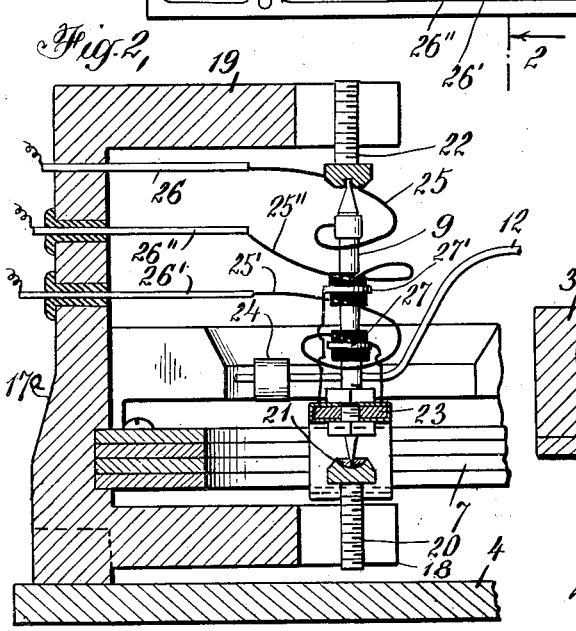
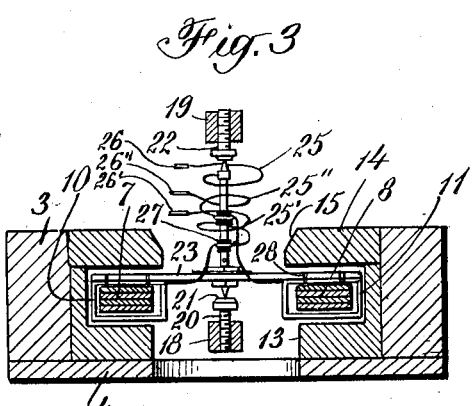
INVENTOR
Charles E. Vawter
BY
Pennie, Davis, Marvin & Edmonds
ATTORNEYS Patented June 28, 1927.

1,633,912

UNITED STATES PATENT OFFICE.

CHARLES E. VAWTER, OF PHILADELPHIA, PENNSYLVANIA, ASSIGNOR TO WESTON ELECTRICAL INSTRUMENT CORPORATION, OF NEWARK, NEW JERSEY, A CORPORATION OF NEW JERSEY.

INDICATING OHMMETER.

Application filed January 7, 1922. Serial No. 527,705.

The present invention relates to an electrical measuring instrument of the indicating type, and has to do particularly with an instrument of the same general class as that illustrated in my Patent No. 1,426,619, which indicates directly the ohmic value of the resistance in an electrical circuit when applied thereto.

It is common to measure resistances of ordinary magnitude by passing a direct current through the resistance and noting the corresponding values of current and impressed voltage, from which data the resistance may be calculated. Such measurement, while usually productive of satisfactory results, necessitates the use of two measuring instruments; namely, a volt-meter and an ammeter, the readings of which must be taken simultaneously in order to give accurate results. In addition, it is necessary that a calculation be completed for each set of readings in order to arrive at the numerical value of the resistance.

Instruments have also been proposed which are designed to indicate directly the ohmic value of the resistance of an electrical circuit. Such instruments, however, are universally subject to a number of limitations and objections. For instance, it is commonly true of instruments of this type that the indicating pointer moves according to a non-uniform scale, the exact character of which cannot be exactly predetermined and which varies in instruments of apparently identical construction. The provision of an accurate scale on such an instrument requires that it be individually calibrated and its scale marked accordingly, which procedure greatly increases its manufacturing cost. The readings are also often inaccurate under certain conditions due to variations in voltage of the battery employed to supply the measuring current, or other disturbances of a like character.

The principal object of the present invention is to provide an indicating ohmmeter instrument of the above type which may be conveniently and quickly applied to an electrical circuit, and which will indicate directly the magnitude of its resistance.

It is a further object to provide an ohmmeter of this type whose indicating pointer moves over a uniform scale, so that readings taken at all portions of the scale range are equally accurate.

It is also an object of the invention to provide an instrument of this type so constructed that a large proportion of the electrical winding on its indicating element is at all times actively traversed by the lines of force emanating from the surrounding magnetic field, thus providing an increased torque for a given current traversing the winding.

It is a further object to provide an instrument of this type in which the total quantity of magnetic flux traversing the coil windings, which are preferably supported upon an aluminum frame, serves to furnish a sufficient magnetic damping action for proper operation of the instrument.

It is a still further object to provide in an ohmmeter of the above type a moving element of improved construction, and in particular an element whose coils are at all times maintained in fixed lateral relation with the magnetic field and core.

I have illustrated a preferred embodiment of my invention in the accompanying drawings, in which Figure 1 is a plan view of my improved ohmmeter, a portion of the pole piece being broken away; Fig. 2 is a partial vertical section on an enlarged scale, taken on line 2—2 of Fig. 1; and Fig. 3 is a transverse section taken on line 3—3 of Fig. 1.

Referring to the drawings, 1 indicates a casing for the assembled parts of the instrument probably of iron or other suitable magnetic metal, for shielding the working parts of the ohmmeter from external magnetic fields. A cover of the same material is preferably provided to enclose the top of the casing and may be secured in place by screws threading into corresponding taps 2 provided on the body of the casing. The magnetic field of the instrument is preferably produced by a horseshoe magnet 3 which is maintained in position by employing as a base a supporting plate 4, made of brass or other non-magnetic material, held fixed relative to the casing 1 by means of screws 4ª which extend up through the bottom of the casing and into the plate 4. A cross brace 5 connected with the supporting plate 4 by means of a screw or bolt 6 is screwed down upon the horseshoe magnet to hold it securely in contact with the base-plate.

Intermediate between the poles of the magnet there is positioned a magnetic core of approximately horseshoe shape having arms 7 and 8. This core is preferably built up of soft iron laminations, but may be of solid metal. Substantially all the magnetic flux passing between poles of the magnet traverses this intermediate core. The moving element of the instrument is carried by a vertical shaft 9 pivoted centrally with respect to the magnet poles and the core, and comprises essentially a pair of coils 10 and 11, symmetrically positioned with respect to the shaft 9 and arranged to surround, respectively, the branches 7 and 8 of the core. When the instrument is employed in measuring the value of an electrical resistance the coils 10 and 11 are each traversed by an independent electric current, one of which currents flows through resistances of fixed or known magnitude, and the other of which traverses and therefore varies with the value of the resistance being measured. As a result the movable coil element, which also comprises the indicating pointer 12, will assume a position of rest bearing a definite relation to the ratio of the two currents traversing the coils 10 and 11, and since one of these currents traverses a known resistance, the position of the pointer will afford an indication of the magnitude of the unknown resistance. The operation of the indicating element of the instrument is substantially the same as set forth in my U. S. Patent No. 1,426,619, granted August 22, 1922. It is to be noted that the arms 7 and 8 of the magnetic core are tapered and that they are not of the same shape. The character of the scale according to which the indicating pointer 12 will move is determined by the shaping of the magnetic core, substantially as described in the above stated patent, and the particular shaping here shown results in a uniform scale throughout the entire range of the instrument, assuring proper theoretical distribution of the magnetic flux over the two poles of the magnet.

For the purpose of securing satisfactory distribution of the magnetic flux, the poles of the horseshoe magnet 3 are supplemented by specially formed pole pieces of U-shaped cross section placed immediately adjacent the inner faces of the legs of the magnet. Each of these pole pieces consists of a portion 13 whose bottom face rests against the metallic supporting plate 4 and extends out a substantial distance beneath the laminated core. For convenience in assembling, the upper portion of the pole piece is formed as a separate unit 14 and is screwed on to the portion 13. The inner edge of the portion 14 is formed on the arc of a circle concentric with the pivot 9 and is preferably tapered off at 15 to insure proper distribution of magnetic flux. It is to be noted that with this form of pole piece the iron of the magnetic circuit surrounds each of the coils 10 and 11 on three sides, and consequently the flux passing between the pole pieces and intermediate core will traverse the winding of the coil along the entire length of the three sides. By making the width of the coil greater than the height as shown, substantially the entire length of the coil winding is actively traversed by the lines of force. Inasmuch as the torque produced by a current traversing the coil is proportional to the total magnetic flux acting upon the winding of the coil, it is evident that with my improved construction a torque is obtained which is at least three or four times that produced by an equal current in the ordinary construction where the flux traverses only one side of the coil.

The particular shape of core shown and the relation and shape of the various other parts of the instrument are intended to produce a uniform scale. The calculations and other operations upon which the determination of these factors was made were, however, based on assumptions as to the strength of the magnets, the distribution of magnetism within the poles of the magnet, and the flux distribution within the pole pieces, core, and other magnetic parts. It is well known that the strength of the magnets and the distribution of magnetism within the poles of the magnet cannot be exactly predetermined, and that the flux carrying properties of the iron parts vary appreciably within a single member. This is particularly true in case the parts are stamped out of a rolled metal sheet, inasmuch as successively stamped parts are not exactly identical in shape and weight, the density of the stamped members is likely to be greater at the edges which have been compressed by the die, and variations in density occur during the rolling out of the sheet metal. Thus, while a substantially uniform scale may be obtained by proper shaping of the parts, some discrepancies in the indication of the pointer invariably occur.

For the purpose of adjusting the magnetic flux density in the air gap, and in this manner furnishing a means for controlling to a certain extent the character of the instrument scale, there are provided one or more screws 16 of magnetic material threaded through a metal bracket 17 secured to the pole face of the magnet. In the drawings I have illustrated two such screws 16 positioned at the rear of the respective pole pieces of the magnet. By moving the screws 16 in toward the magnetic core the air gap at that particular point is greatly decreased and consequently an increased quantity of magnetic lines of force will find their way between the pole piece and the core by way of the screw 16. The screw in fact serves as a shunt passage for a number of lines of force which would otherwise traverse the air gap, and consequently results in a certain lessening of the flux density along the gap. The change in density of the flux traversing the air gap which is effected by adjusting the screws 16 is not a uniform change, since a more appreciable change in the flux will be effected by that portion of the air gap adjacent the adjusting screw. By providing four such screws; that is, one adjacent the base of each core arm and one adjacent its tip, any desired adjustment of the flux traversing the air gap may be obtained. If an instrument of extreme accuracy is required four such screws are provided, but I have found that for ordinary use an instrument equipped with two flux adjusting screws is satisfactory for general purposes.

In adjusting the instrument for instance, the indicating pointer may not exactly coincide with the correct marking on the scale. One or more of the adjusting screws is then moved in such manner as to bring the indicating pointer into proper position. If now another point on the scale be selected and, when the instrument is applied to a corresponding resistance value for the purposes of the test, the indicating pointer is found to be in error, one or more of the remaining adjusting screws may be utilized to bring the pointer into correct position for this value of resistance. By properly manipulating the adjusting screws the needle may be adjusted to register with extreme accuracy throughout its entire range, although a substantial registration of the pointer with the indications on the scale may be attained with a lesser number of flux adjusting screws. The same principle may be employed to change the total scale range of the instrument. For instance, a screw of large size may be employed in order that the change in flux distribution effected by adjusting the screw may be great enough to work a substantial change in the total scale range, or a member of magnetic material may be specially provided for the purpose. I preferably, however, confine the adjusting screws to use in causing the indicating pointer to register with the scale markings, and effect a change in the total scale range by means of a variable resistance connected in circuit with the instrument as disclosed in my above-mentioned patent.

The provision of this flux adjusting member 16 permits the magnet and pole pieces to be formed and the laminated core stamped out and the parts assembled in position within the casing 1 without necessity of undue care as to machining of the parts, and the like. The scale of the instrument will be uniform inasmuch as the core has been shaped specifically for that purpose. A scale 12ᵃ having the desired range marked upon it may be mounted in the instrument and, by subsequent adjustment of the screws 16 after the instrument is completely assembled, the indications of the pointer may be made to correspond to the markings on the scale. This feature results in a pronounced saving in cost of the manufactured article and permits an accurate instrument of this character to be placed on the market commercially at a very low price.

I preferably support the moving element of the instrument by means of a non-magnetic bracket 17ᵃ screwed to the base plate 4 and having a pair of horizontally projecting arms 18 and 19. The lower arm 18 carries a post 20 threaded for vertical adjustment in the arm, and having at its upper end a jewelled bearing 21 in which rests the lower end of the shaft 9 of the moving element. The upper end of the shaft 9 works in the support provided by a screw 22 threaded into the upper projection arm 19, and which serves to restrain the upper end of the shaft from horizontal movement.

The coils 10 and 11 may be supported from the shaft 9 in any desired manner, but I preferably affix to the shaft a horizontally extending aluminum strip 23, the outer ends of which extend over the arms of the magnetic core. The coils 10 and 11 are supported at the ends of the strip 23 on its under side by a layer of silicate or other cement. The shaft 9 also carries the indicating pointer 12, which preferably comprises a counter weight 24 swung on a rearwardly extending portion of the pointer for the purpose of balancing it symmetrically to its axis of rotation.

I have observed that in electrical measuring instruments of the type comprising a movable coil element traversing a variable magnetic field, that errors very commonly occur which are due to movement of the coils in the field, in addition to their normal movement, caused by lateral displacements of the upper end of the shaft in its loose bearing. In order to overcome this difficulty I have mounted the jewelled bearing 21 at a point but slightly below the geometrical center of the movable coils. Thus any lateral movement due to looseness of the bearing at the upper end of the shaft, any unevenness of operation due to a defective jewel in the lower bearing, and the like, will produce substantially no lateral movement of the shaft at the point of attachment of the movable coils, and the coils will remain in fixed lateral relation to the magnetic core with a corresponding accuracy of indication.

The electrical connections to the coils 10 and 11 are illustrated particularly in Figs. 2 and 3. One end of each coil terminates preferably in the aluminum bar 23 which is in contact with the shaft 9 and is at ground potential. Current from the shaft is conveyed through a fine trailer 25 to a terminal 26 provided in the vertical support 17 and which is connected to the binding post C provided on the instrument casing 1. The other ends of the coils 10 and 11 are led out to contacts 27 and 27' carried by the shaft 9 and insulated from it, and from whence current passes through light metallic trailers 25' and 25'', preferably gold or silver ribbons which produce substantially no torque on the movable element, to terminals 26' and 26'', respectively, and from thence to binding posts A and B on the instrument casing 1. These binding posts are then at substantially the same potential as the ends of the coils 10 and 11, while the binding post C is at ground potential and represents the neutral point between the two coils. When the instrument is in use a dry cell or similar battery may be employed to furnish the measuring current.

Certain changes in the construction of the instrument may be made without departing from the spirit of the invention. For instance, the shape of the core arms 7 and 8 determines the character of the instrument scale, and it is evident that various forms may be given to the individual core arms and still retain a combination of the two which will produce a uniform scale. Furthermore, any character of scale may be obtained by properly varying the shape of the core and, if desired, the instrument may be provided with a non-uniform scale. Further changes in the details of construction such as the mountings of the various parts within the instrument box, the exact construction of the pole pieces and other parts for convenience in assembling, and the like, may be varied within the full scope of the appended claims. It is, however, understood that the operation of my improved ohmmeter is in general similar to that of the instrument disclosed in my above mentioned patent, and that I may employ an instrument embodying my present invention in conjunction with the particular circuit connections, contact arrangements, and resistances disclosed in that patent.

I claim:

1. An instrument of the class described comprising a magnet for producing the magnetic field of the instrument, a core intermediate the poles of the magnet for determining the distribution of magnetic flux in said field and a screw of magnetic material in the magnetic circuit between the magnet and said core mounted to be threaded into adjustment at a desired distance from said core to thereby regulate the density of the magnetic flux in the gap between said core and the poles of said magnet.

2. An instrument of the class described, comprising a magnet for producing the magnetic field of the instrument, a core intermediate the poles of the magnet for determining the distribution of flux in said field, said core being stationary relative to the magnet, and a shunt path of variable reluctance between the magnet and the core for regulating the density of the magnetic flux in the gap between said core and magnetic pole.

3. An instrument of the class described, comprising a magnet for producing the magnetic field of the instrument, a core intermediate the poles of the magnet for determining the distribution of flux in said field, said core being stationary relative to the magnet, an electrically conducting element movable in the air gap between said core and the pole of said magnet, and an adjustable member of magnetic material for providing a shunt path of adjustable reluctance between said core and magnet, whereby the flux density in said gap is varied.

4. An apparatus of the class described, comprising a magnet for producing the magnetic field of the instrument, a core intermediate the poles of the magnet for determining the distribution of flux in said field, said core having two arms adjacent respectively the poles of the magnet, an electrically conducting element comprising a pair of coils surrounding the respective arms of said core, and movable in the magnetic field, means for admitting current to said coils, and means adjustable between said core and magnet for regulating the density of the magnetic flux traversing the windings of said coils.

5. An instrument of the class described comprising a magnet for producing a magnetic field, a core of magnetic material positioned within said field and having a pair of arms shaped to produce a predetermined distribution of the magnetic flux, a pair of rigidly connected opposing coils surrounding the respective arms of said core and movable about a common axis in the magnetic field and pole pieces associated with said magnet, each of said pole pieces being shaped to surround a substantial portion of the periphery of the coil moving adjacent thereto.

6. In an instrument of the class described, comprising a magnet for producing the magnetic field of the instrument, a magnetic core intermediate the poles of said magnet, said core having two arms adjacent respectively the poles of the magnet, an electrically conducting element comprising a pair of coils surrounding the respective arms of said core and movable in the magnetic field, and pole pieces associated with the poles of said magnet enclosing a substantial portion of the periphery of said coils and corresponding arms of the core.

In testimony whereof I affix my signature.

CHARLES E. VAWTER.